United States Patent
Queveau et al.

(10) Patent No.: US 6,877,790 B2
(45) Date of Patent: Apr. 12, 2005

(54) VEHICLE FOLDING ROOF COMPRISING ROOF ELEMENTS EQUIPPED WITH TELESCOPIC SLIDES

(75) Inventors: Gérard Queveau, Le Pin (FR); Albéric Sorin, Le Pin (FR)

(73) Assignee: France Design, Le Pin (FR)

( * ) Notice: Subject to any disclaimer, the term of this patent is extended or adjusted under 35 U.S.C. 154(b) by 0 days.

(21) Appl. No.: 10/450,758

(22) PCT Filed: Dec. 10, 2001

(86) PCT No.: PCT/FR01/03901

§ 371 (c)(1),
(2), (4) Date: Jan. 26, 2004

(87) PCT Pub. No.: WO02/47930

PCT Pub. Date: Jun. 20, 2002

(65) Prior Publication Data

US 2004/0155491 A1 Aug. 12, 2004

(30) Foreign Application Priority Data

Dec. 13, 2000 (FR) .......................................... 00 16253

(51) Int. Cl.$^7$ .............................. B60J 7/047; B60J 7/14
(52) U.S. Cl. ............. 296/108; 296/216.03; 296/220.01
(58) Field of Search ............... 296/108, 216.02–216.03, 296/220.01, 223

(56) References Cited

U.S. PATENT DOCUMENTS

| 3,713,689 A | * | 1/1973 | Podolan et al. ........ 296/220.01 |
| 5,806,912 A | * | 9/1998 | Ramaciotti et al. .... 296/107.09 |

FOREIGN PATENT DOCUMENTS

| JP | 362210124 | * | 9/1987 | ............ 296/216.03 |
| JP | 306822 | * | 12/1990 | ................. 296/108 |

* cited by examiner

*Primary Examiner*—Dennis H. Pedder

(57) ABSTRACT

The invention concerns roof elements (1, 2) mobile between a first position wherein they cover the vehicle passenger compartment, a second position wherein the front roof element (1) is located above the rear roof element (2), a third position wherein the two roof elements (1, 2) are stowed in the vehicle rear deck. The mechanism (3) for lifting the front roof element (1) comprises two intersecting levers (8, 9) articulated at their intersection (10) one of the ends of said levers (8, 9) being articulated to a front telescopic element (5), the other end of said levers (8, 9) being linked to means for displacing each of said ends in opposite directions oriented in a direction parallel to the front telescopic element (5).

9 Claims, 6 Drawing Sheets

VEHICLE FOLDING ROOF COMPRISING ROOF ELEMENTS EQUIPPED WITH TELESCOPIC SLIDES

The present invention concerns a retractable roof composed of rigid elements which can be stored in the rear boot of a vehicle.

The retractable roof thus makes it possible to convert a vehicle of the saloon or coupé type into a vehicle of the cabriolet type.

A description was given in French patent application N° 99 10 204 of a retractable roof for a vehicle comprising three rigid elements, namely a front element, an intermediate element and a rear element, the latter being connected to the bodywork by pivoting arms.

These three elements of the roof are able to be moved between a position in which they cover the passenger compartment of the vehicle, a second position in which the front roof element is situated above the intermediate element and a third position in which the roof elements are stored in the rear boot of the vehicle.

In the embodiment described in the above mentioned patent application, the movement of the front element towards the intermediate element is provided by a slide which makes it possible to raise the front element with respect to the intermediate element.

The sliding of the front element above the intermediate element is then provided by means of a telescopic slide.

This telescopic slide comprises a front telescopic element fixed to the front roof element and a rear telescopic element fixed to the intermediate roof element, these two telescopic elements being connected together by an intermediate telescopic element.

The aim of the present invention is to afford improvements to the aforementioned retractable roof.

The invention thus relates to a retractable roof for a vehicle, comprising a front roof element and a rear roof element able to be moved between a first position in which they cover the passenger compartment of the vehicle, a second position in which the front roof element is situated above the rear roof element, a third position in which the two roof elements are stored in the rear boot of the vehicle, the means for moving the roof element to the second position comprising a mechanism for raising the front roof element and a telescopic slide for moving the front roof element over the rear roof element, the telescopic slide comprising a front telescopic element fixed to the front roof element, a rear telescopic element fixed to the rear roof element, these two telescopic elements being connected together by an intermediate telescopic element.

According to the invention, this retractable roof is characterised in that the mechanism for raising the front roof element comprises two crossed levers articulated at their crossing point, one of the ends of these levers being articulated on the front telescopic element, the other end of the said levers being connected to means for moving each of these ends in opposite directions oriented in a direction parallel to the front telescopic element.

According to a preferred version of the invention, each of the said ends of the levers comprises a nut screwed on a threaded rod fixed to the front roof element and extending in a direction parallel to the front telescopic element, the said threaded rod comprising two portions in which the screw threads are reversed, each of them carrying one of the nuts.

The rotation of this threaded rod controlled by an electric motor makes it possible to make the levers pivot and therefore to raise the front roof element over the rear roof element.

The sliding of the telescopic slides, which can be controlled by a second electric motor, moves the front roof element over the rear roof element.

Other particularities and advantages of the invention will also emerge from the following description.

In the accompanying drawings given by way of non-limiting examples:

Figure 1:
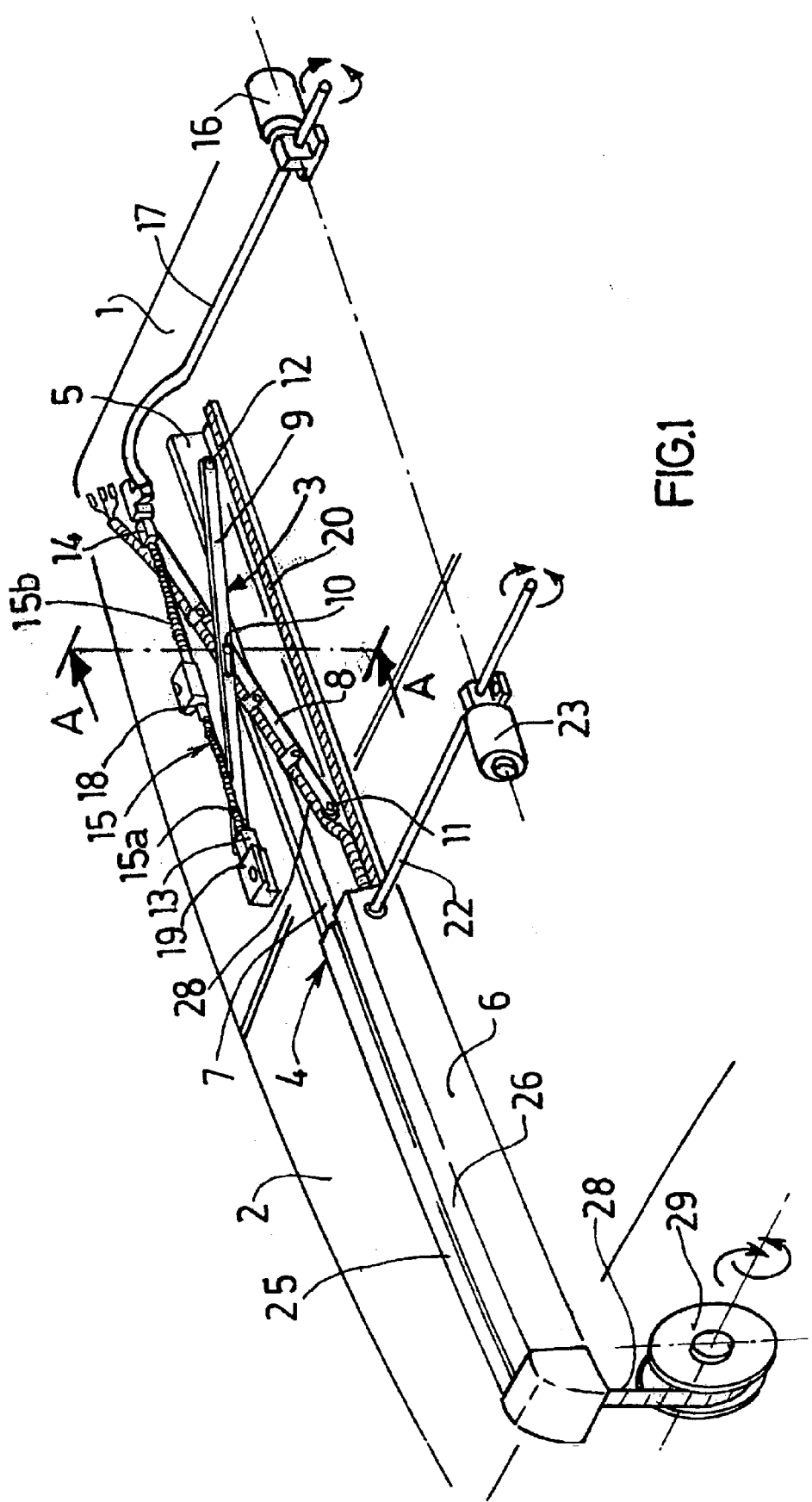
FIG. 1 is a schematic perspective view showing a retractable roof according to the invention, in the closed position.
Figure 2:
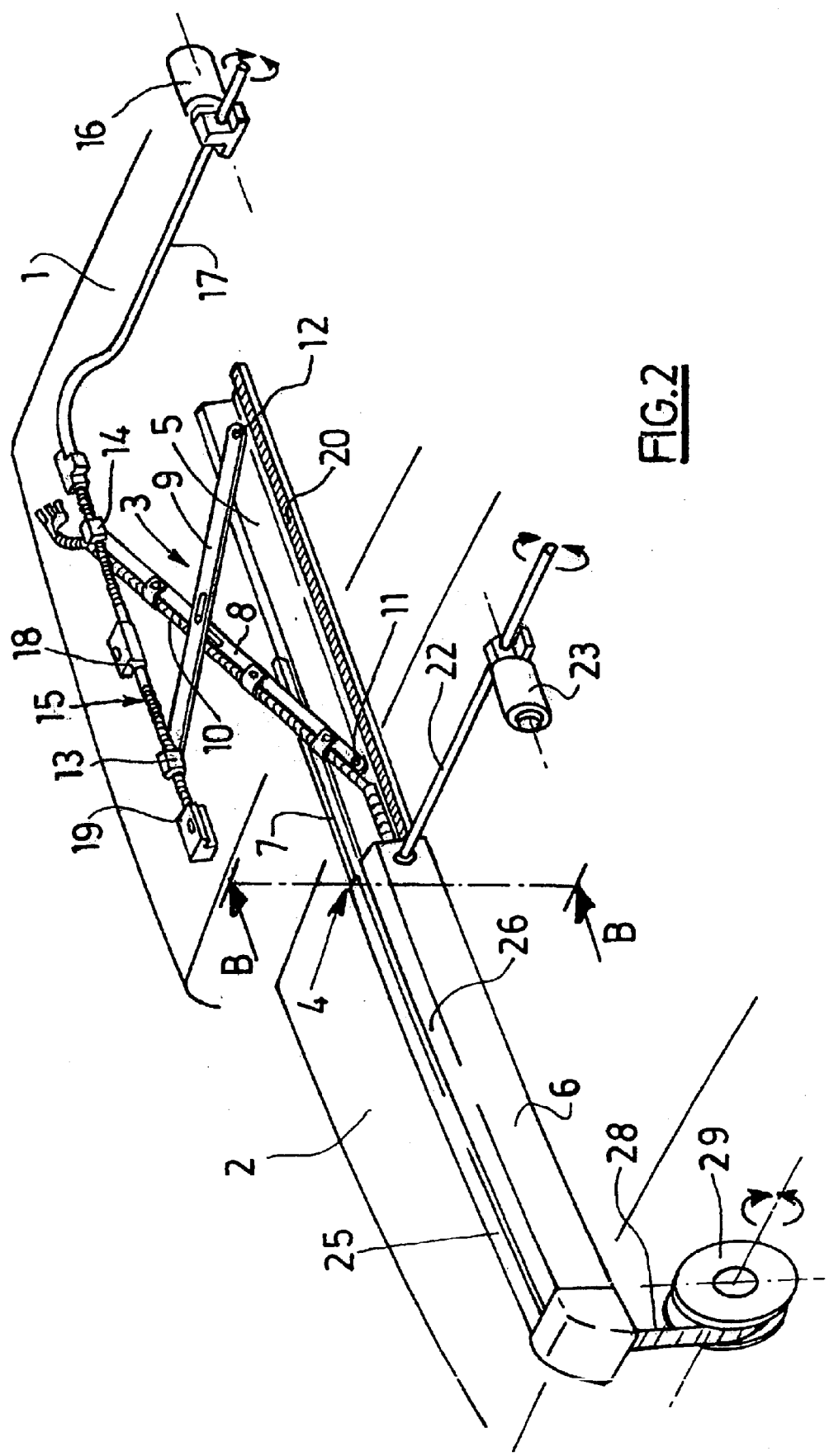
FIG. 2 is a view similar to FIG. 1 showing the front roof element in the raised position.
Figure 3:
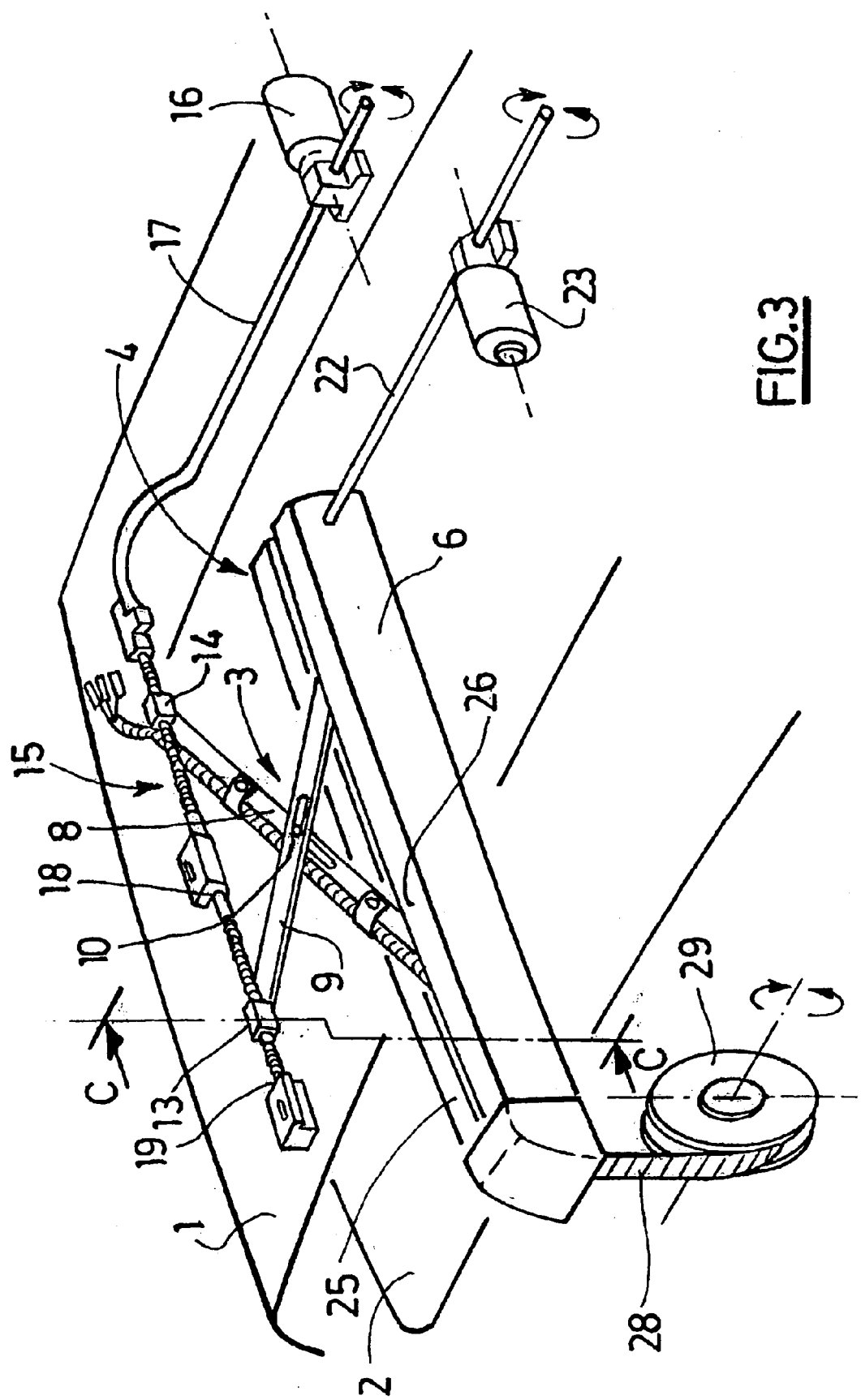
FIG. 3 is a view similar to FIGS. 1 and 2 showing the front roof element in the position above the rear roof element.

With reference to FIGS. 1 to 3, the retractable roof for a vehicle comprises a front roof element 1 and a rear roof element 2 able to be moved between a first position (see FIG. 1) in which they cover the passenger compartment of the vehicle, a second position (see FIG. 3) in which the front roof element 1 is situated above the rear roof element 2 and a third position (not shown) in which the two roof elements 1, 2 are stored in the rear boot of the vehicle.

The means for moving the roof elements 1, 2 to the second position comprise on is each side of the roof a mechanism 3 for raising the front roof element 1 and a telescopic slide 4 for moving the front roof element 1 above the rear roof element 2.

The telescopic slide 4 comprises a front telescopic element 5 fixed to the front roof element 1 and a rear telescopic element 6 fixed to the rear roof element 2, these two telescopic elements 5, 6 being connected together by an intermediate telescopic element 7.

In accordance with the invention, the mechanism 3 for raising the front roof element 1 comprises two crossed levers 8, 9 articulated at their crossing point 10.

One of the ends of these levers 8, 9 is articulated at 11, 12 on the front telescopic element 5.

The other end of the levers 8, 9 is connected to means for moving each of these ends in opposite directions oriented in a direction parallel to the front telescopic element 5.

Each of the top ends of the levers 8, 9 comprises a nut 13, 14 screwed onto a threaded rod 15 fixed to the front roof element 1 and extending in a direction parallel to the front telescopic element 5. This threaded rod 15 comprises two portions 15a, 15b in which the screw threads are reversed.

Each of the portions 15a, 15b carries one of the nuts 13, 14.

In addition, the front roof element 1 comprises at its middle an electric motor 16 connected by a flexible shaft 17 to the threaded rod 15 in order to drive it in rotation.

In addition, the threaded rod 15 is mounted for rotation in two bearings 18, 19 fixed to the front roof element 1.

As shown in particular by FIGS. 1 and 2, the front telescopic element 5 comprises a rack 20 which extends over its entire length, on which there is meshed (see FIG. 5) a pinion 21 fixed with respect to rotation to the front end of the rear telescopic element 6.

The pinion 21 is connected by a flexible shaft 22 to an electric motor 23 fixed to the middle of the rear roof element 2.

Figure 4:
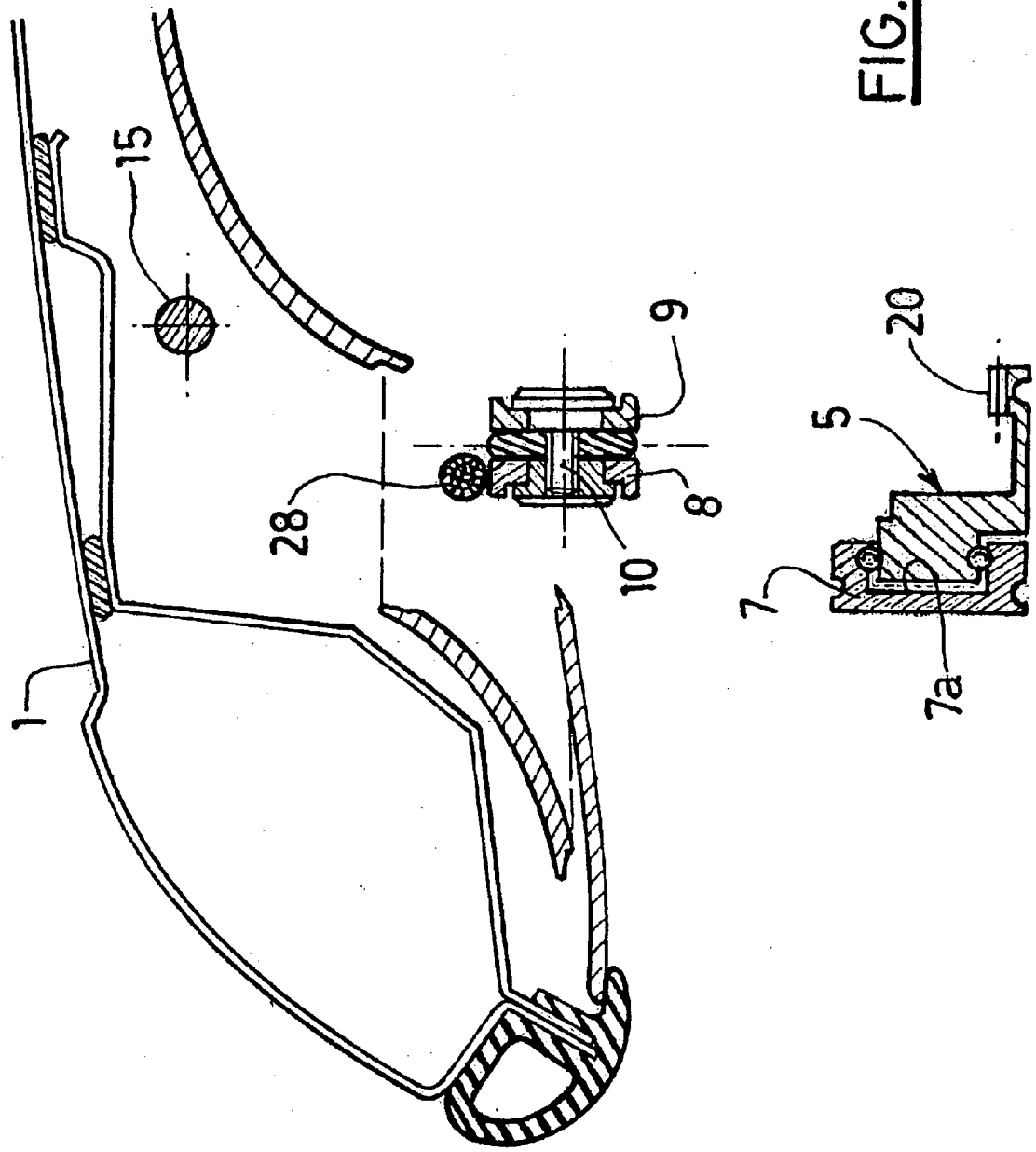
FIG. 4 is a view in section along the plane A—A in FIG. 1.
Figure 5:
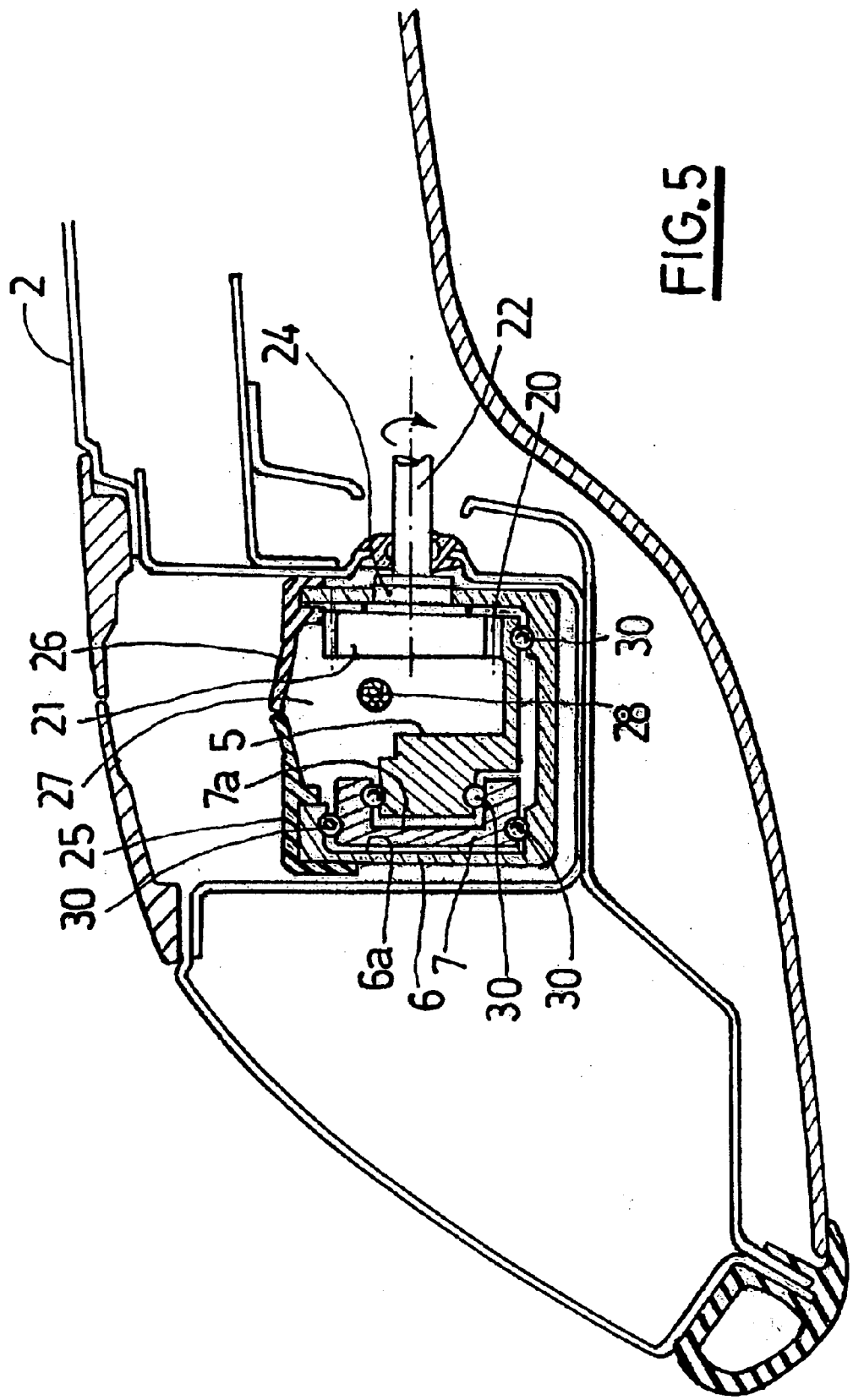
FIG. 5 is a view in section along the plane B—B in FIG. 2.
Figure 6:
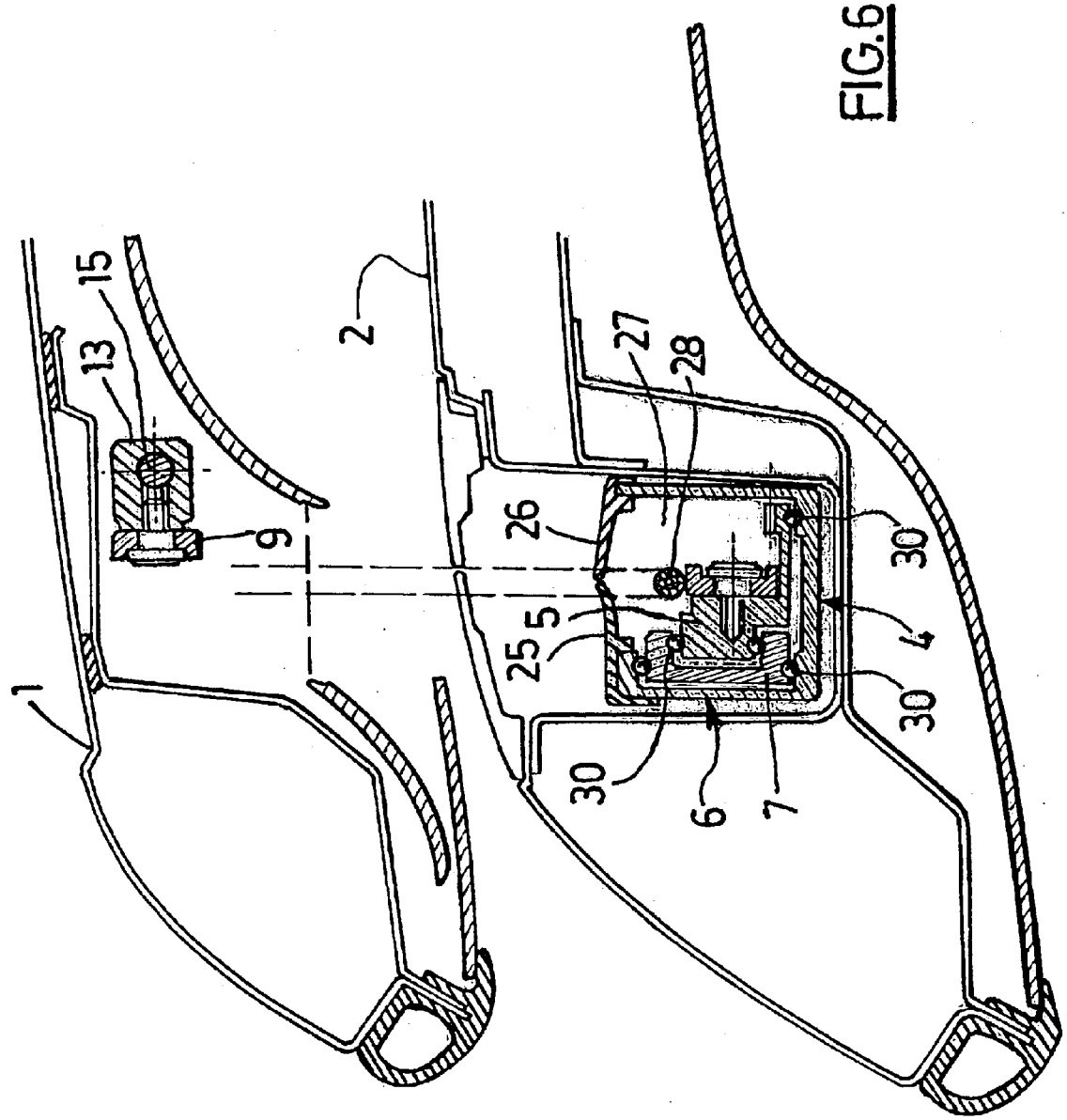
FIG. 6 is a view in section along the plane C—C in FIG. 3.

As indicated by FIGS. 4, 5 and 6, the front telescopic element 5 has a transverse section substantially in the shape of an L, one of whose legs carries the rack 20.

The other leg of the element 5 is engaged slidably in a longitudinal groove 7a in the intermediate telescopic element 7.

The latter is itself engaged slidably in a longitudinal groove 6a in the rear telescopic element 6.

It can also be seen in FIGS. 5 and 6 that the rear telescopic element 6 has a substantially U-shaped cross-section in which the front 5 and intermediate 7 telescopic elements are housed.

One of the legs of the U has on its internal face the longitudinal groove 6a slidably receiving the intermediate telescopic element 7.

The other leg of the U comprises a bearing 24 in which there is engaged the shaft of the pinion 21 meshed with the rack 20.

In addition the relative sliding of the telescopic elements 5, 6, 7 is provided by balls 30.

Moreover, the U-shaped section of the rear telescopic element 6 is closed at its top part by two flexible contiguous sealing strips 25, 26.

It can also be seen in FIGS. 5 and 6 that the U-shaped section of the element 6 comprises a free space 27 in which there extends a cable 28 carrying the electrical supply wires to the electric motor 16.

One of the ends of the cable 28 is wound on a reel-up 29 situated close to the rear end of the rear telescopic element 6. The other end of the cable 28 is fixed along one 8 of the levers 8, 9 of the mechanism 3 controlling the raising of the front roof element 1.

The functioning of the retractable roof which has just been described will now be explained.

After the motor 16 is started, it drives the threaded rod 15 in rotation. The latter screws into the nuts 13 and 14.

The latter drive the levers 8, 9 whilst bringing their top ends closer together. The movement of the levers 8, 9 controls the raising of the front roof element 1, as shown by FIG. 2.

The starting of the motor 23 is then demanded.

The latter drives the pinion 21 in rotation.

The rotation of the pinion 21 controls the translation of the rack 20 and the sliding of the front telescopic element 5 and of the intermediate telescopic element 7 towards the rear telescopic element 6.

During this movement, the cable 28 follows the movement of the front telescopic element 5 and is wound on the reel-up 29.

At the end of travel, the front roof element 1 is situated above the rear roof element 2, as shown by FIG. 3.

From the position depicted in FIG. 3, the two superimposed elements can be moved into the rear boot of the vehicle by a system of pivoting arms or by a system of slides or by a combination of these two systems.

What is claimed is:

1. A retractable roof for a vehicle, comprising a front roof element (1) and a rear roof element (2) able to be moved between a first position in which they cover the passenger compartment of the vehicle, a second position in which the front roof element (1) is situated above the rear roof element (2), a third position in which the two roof elements (1, 2) are stored in the rear boot of the vehicle, the means for moving the roof element (1) to the second position comprising a mechanism for raising the front roof element (1) and a telescopic slide (4) for moving the front roof element (1) over the rear roof element (2), the telescopic slide (4) comprising a front telescopic element (5) fixed to the front roof element (1), a rear telescopic element (6) fixed to the rear roof element (2), these two telescopic elements (5, 6) being connected together by an intermediate telescopic element (7), characterised in that the mechanism (3) for raising the front roof element (1) comprises two crossed levers (8, 9) articulated at their crossing point (10), one of the ends of these levers (8, 9) being articulated on the front telescopic element (5), the other end of the said levers (8, 9) being connected to means for moving each of these ends in opposite directions oriented in a direction parallel to the front telescopic element (5).

2. A retractable roof according to claim 1, characterised in that said means for moving comprises a nut (13, 14) screwed on a threaded rod (15) fixed to the front roof element (1) and extending in a direction parallel to the front telescopic element (5), the said threaded rod (15) comprising two portions (15a, 15b) in which the screw threads are reversed, each of them carrying one of the nuts (13, 14).

3. A retractable roof according to claim 2, characterised in that the front roof element (1) comprises an electric motor (16) for driving the threaded rod (15) in rotation.

4. A retractable roof according to claim 2, characterised in that the threaded rod (15) is mounted for rotation in two bearings (18, 19) fixed to the front roof element (1).

5. A retractable roof according to claim 1, characterised in that the front telescopic element (5) comprises a rack (20) which extends over its entire length on which there is meshed a pinion (21) fixed with respect to rotation to the front end of the rear telescopic element (6), the said pinion (21) being connected to an electric motor carried by the rear roof element (2).

6. A retractable roof according to claim 5, characterised in that the front telescopic element (5) has a transverse section substantially in the shape of an L, one of whose legs carries the rack (20), the other leg being slidably engaged in a longitudinal groove (7a) in the intermediate telescopic element (7), the latter itself being slidably engaged in a longitudinal groove (6a) in the rear telescopic element (6).

7. A retractable roof according to claim 6, characterised in that the rear telescopic element (6) has a substantially U-shaped section in which the front (5) and intermediate (7) telescopic elements are housed, one of the legs of the said U comprising on its internal face the longitudinal groove (6a) slidably receiving the intermediate telescopic element (7), the other leg of the said U comprising a bearing (24) in which there is engaged the shaft of the pinion (21) meshed with the said rack (20).

8. A retractable roof according to claim 7, characterised in that the said U-shaped section of the rear telescopic element (6) is closed by two contiguous sealing strips (25, 26).

9. A retractable roof according to claim 7, characterised in that the said U-shaped section comprises a free space (27) in which there extends a cable (28) carrying electrical supply wires to an electric motor for the front roof element (16), one of the ends of the said cable (28) being wound on a reel-up (29) situated close to the rear end of the rear telescopic element (6), the other end of the cable (28) being fixed along one (8) of the said levers (9) of the mechanism (3) controlling the raising of the front roof element (1).

* * * * *